United States Patent [19]
Moriyama et al.

[11] Patent Number: 5,516,213
[45] Date of Patent: May 14, 1996

[54] CYLINDRICAL BEARING WITH SOLID LUBRICANT EMBEDDED AND FIXED IN INNER PERIPHERAL SURFACE THEREOF

[75] Inventors: Shirosaku Moriyama; Toshihiko Sekine, both of Fujisawa, Japan

[73] Assignee: Oiles Corporation, Tokyo, Japan

[21] Appl. No.: 271,823

[22] Filed: Jul. 7, 1994

[30] Foreign Application Priority Data

Dec. 29, 1992 [JP] Japan .................................. 4-361155

[51] Int. Cl.[6] .................................................. F16C 33/10
[52] U.S. Cl. .......................................................... 384/292
[58] Field of Search ................................. 384/292, 283, 384/120, 909, 910, 913

[56] References Cited

U.S. PATENT DOCUMENTS

| 1,122,565 | 12/1914 | Bache | 384/283 |
| 1,153,647 | 9/1915 | Smalley | 384/283 |
| 4,678,348 | 7/1987 | Tielemans et al. | 384/292 |

FOREIGN PATENT DOCUMENTS

| 26-4006 | 4/1951 | Japan . |
| 39-2506 | 3/1964 | Japan . |
| 52-153857 | 12/1977 | Japan . |
| 52-153858 | 12/1977 | Japan . |

Primary Examiner—Lenard A. Footland
Attorney, Agent, or Firm—Nixon & Vanderhye

[57] ABSTRACT

A cylindrical bearing with a solid lubricant embedded and fixed in a plurality of first and second helical grooves formed in an inner peripheral surface thereof, wherein each first helical groove is formed with a rightward rising inclination at an angle $\theta_1$ of more than 0° and not more than 45° with respect to a reference line, while each second helical groove is formed with a leftward rising inclination at an angle $\theta_2$ of more than 0° and not more than 45° with respect to the reference line, a line which connects shorter diagonal lines of parallelograms each formed by connecting points of intersection of adjacent ones of the first helical grooves and adjacent ones of the second helical grooves intersecting with the adjacent ones of the first helical grooves forms an angle $\theta_3$ of less than 90° with respect to the reference line.

20 Claims, 8 Drawing Sheets

F I G. 4
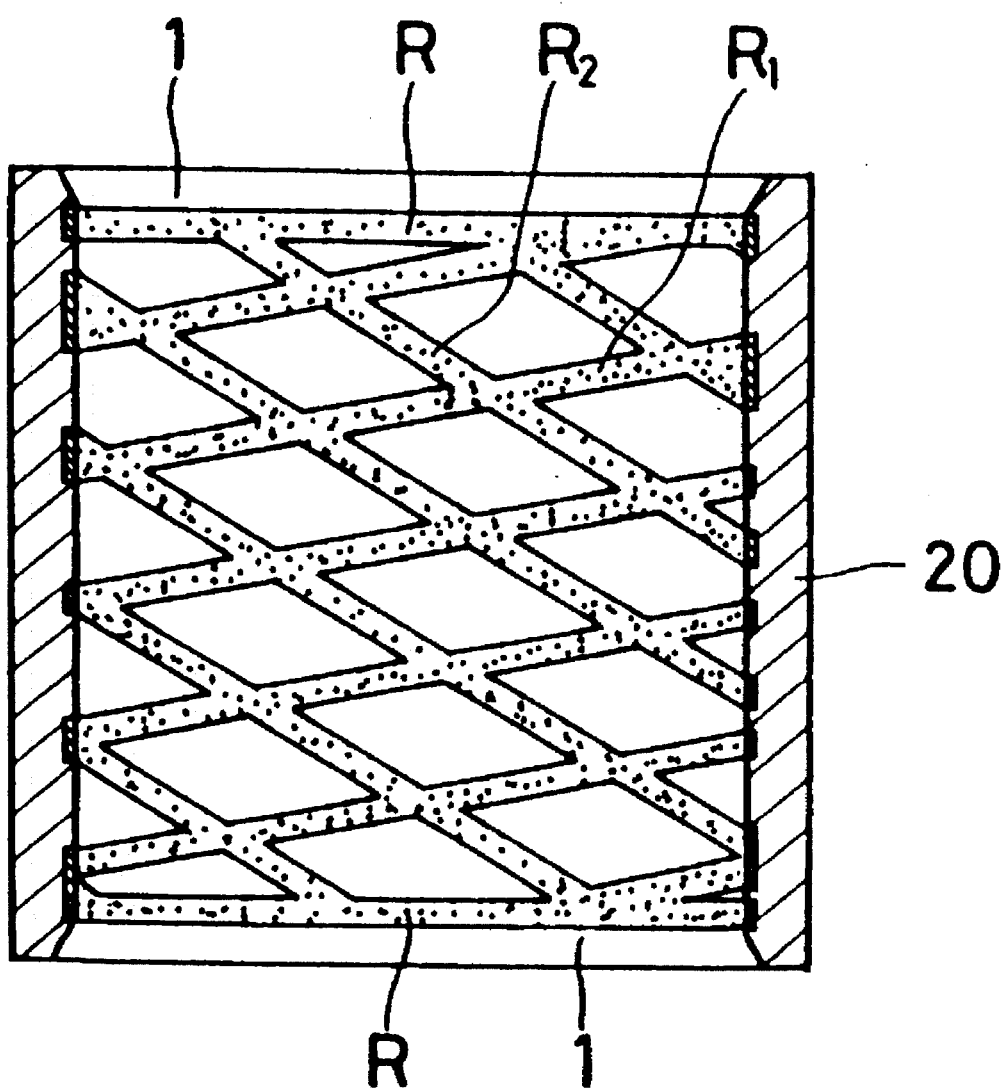

F I G. 6
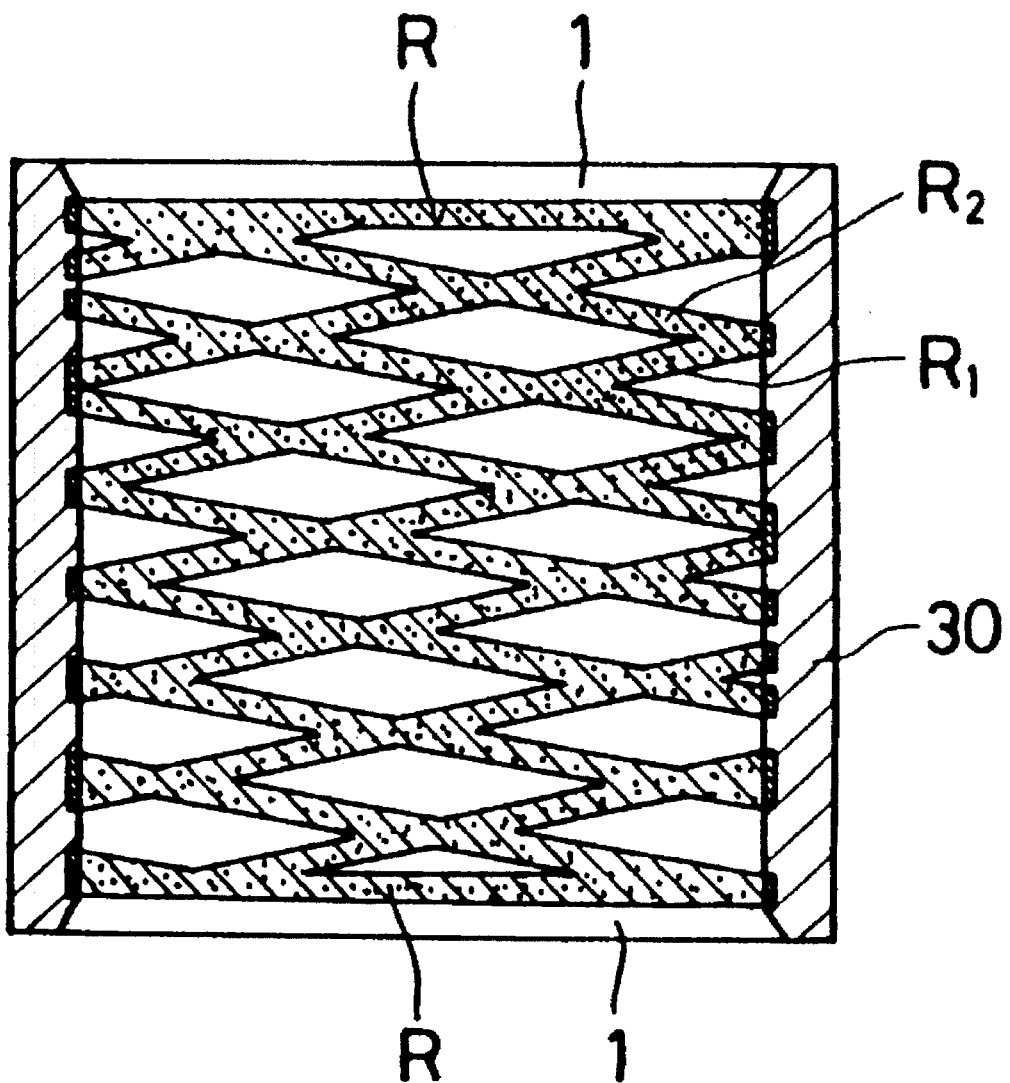

CYLINDRICAL BEARING WITH SOLID LUBRICANT EMBEDDED AND FIXED IN INNER PERIPHERAL SURFACE THEREOF

BACKGROUND OF THE INVENTION

Field of the Invention

The present invention relates to a cylindrical bearing in which a solid lubricant is embedded and fixed in an inner peripheral surface of the bearing.

Description of the Related Art

Conventionally, so-called sliding members of a solid-lubricant embedded type, in which through holes or grooves are formed in a metal base made of a copper- or iron-based alloy, and a solid lubricant is embedded and fixed in the holes or grooves, are used as various mechanical components.

Methods of manufacturing the sliding members of the solid-lubricant embedded type include a) a method in which, after a molten metal is cast into a mold by using as a core of the mold a graphite round rod having a helical protrusion formed on its outer peripheral surface, the core is removed by cutting to allow the solid lubricant (graphite) to be exposed on the sliding surface in a helical shape (refer to Japanese Patent Application Publication No. 2506/1964), b) a method in which a plurality of through holes are formed in a metal base, and solid lubricant plugs with an adhesive applied thereto are embedded and fixed in the through holes, and c) a method in which helical grooves are formed in an inner peripheral surface of a metal base, and a solid lubricant is embedded and fixed in the helical grooves (refer to Japanese Patent Application Laid-Open No. 153857/1977).

Among the above-described conventional manufacturing methods, the method a) has the problem that since graphite which has high thermal conduction is used as a core as it is, the molten metal fails to reach every corner of a cavity during casting, the problem of yield that most of graphite is wasted, and the problem that the configuration of the sliding member or the configuration of the embedded solid lubricant is limited.

In the method b), particularly in the case of a method in which a plurality of through holes are formed in a metal base, and a solid lubricant is embedded and fixed in the through holes, the following problems are encountered: Since the sizes (hole diameters) of through holes provided in the base differ in correspondence with the relative size of the metal base, it is necessary to assort solid lubricant plugs of various sizes conforming to the hole diameters. Since the operation of embedding the solid lubricant plugs with an adhesive applied thereto is difficult and is therefore effected manually, the operating efficiency is very poor.

In the method c), a solid lubricant is embedded and fixed in helical grooves or annular grooves provided in an inner peripheral surface of a cylindrical metal base, and the configuration of the helical grooves disclosed in Japanese Patent Application Laid-Open No. 153857/1977 is shown FIGS. 7 and 8 which are a plan view in a case where the cylindrical base is developed in a planar state and a longitudinal cross-sectional view of the cylindrical base, respectively. In the case of the configuration of these helical grooves $R_1$ and $R_2$, portions where the solid lubricant embedded and fixed in the helical grooves $R_1$ and $R_2$ is arranged coarsely in the axial direction of the cylindrical metal base (a portion A—A in FIG. 7) and portions where the solid lubricant is arranged densely (a portion B—B in FIG. 7) are clearly distinguishable, so that directionality appears in optimal load points in the assembly of the cylindrical bearing and a mating shaft member. For example, if the cylindrical bearing is assembled onto the mating shaft member in such a way that the load points occur in the portions where the solid lubricant is arranged coarsely (the portion A—A in FIG. 7), for instance, a problem arises in that the performance of the solid lubricant cannot be sufficiently demonstrated.

In addition, in the above-described methods a) to c), the following problem is also encountered.

Namely, in the case of the bearing in which the solid lubricant is embedded and fixed, since the embedded and fixed solid lubricant is supplied in small amounts to a sliding surface, and a solid lubricant film is formed there, the bearing can be used for prolonged periods of use without supplying a lubricant separately. However, since its use is substantially limited to low-speed high-load areas, it is inevitable to jointly use a lubricating oil in the case of applications in which such areas are not involved. Therefore, in the case of bearings of the solid-lubricant embedded type which are used in applications in which such areas are not involved, it is necessary to provide means such as forming grooves for retaining grease in the sliding surface, or supplying a lubricating oil onto the sliding surface by means of an oiler.

To overcome the above-described problems of the conventional art, solid lubricants which exhibit fluidity and contain lubricating oils have been developed, and means have been proposed which are disclosed in Japanese Patent Application Laid-Open Nos. 89891/1992 and 9979/1994 (corresponding to U.S. application Ser. No. 07/964,147).

These solid lubricants have advantages in that (A) the solid lubricants are not restricted in the size, configuration and the like of grooves formed in the metal base, (B) the solid lubricants exhibit two types of effect, i.e., the lubricating effect based on the lubricating oil and the lubricating effect based on the solid lubricant, and (C) the solid lubricants can be fixed in grooves.

When these solid lubricants were embedded and fixed in the helical grooves in the inner peripheral surface of a cylindrical metal base disclosed in Japanese Patent application Laid-Open No. 153857/1977, and the cylindrical bearing was slid with respect to a mating shaft member, it was found that large differences occur in the bearing performance depending on the configuration of the helical grooves in which the solid lubricant is embedded and fixed.

SUMMARY OF THE INVENTION

Accordingly, it is an object of the present invention to provide a cylindrical bearing in which a solid lubricant is embedded and fixed which makes it possible to sufficiently demonstrate the characteristics of the lubricant by specifying the configuration of helical grooves in which the solid lubricant is embedded and fixed, thereby overcoming the above-described problems of the conventional art.

To this end, in accordance with one aspect of the present invention, there is provided a cylindrical bearing in which a solid lubricant is embedded and fixed in first helical grooves and second helical grooves formed in an inner peripheral surface of the cylindrical bearing, wherein, if the cylindrical bearing is developed in a planar state, each of the first helical grooves is formed with a rightward rising inclination at an angle $\theta_1$ of more than 0° and not more than 45° with respect to a reference line defined by a line extending in a direction orthogonal to an axis of the cylindrical bearing, while each of the second helical grooves is formed with a leftward rising inclination at an angle $\theta_2$ of more than 0° and not more than 45° with respect to the reference line, a line which connects shorter diagonal lines of parallelograms each formed by connecting points of intersection of adjacent ones of the first helical grooves and adjacent ones of the second helical grooves intersecting with the adjacent ones of the first helical grooves forms an angle $\theta_3$ of less than 90° with respect to the reference line.

In accordance with another aspect of the invention, a pair of annular grooves are respectively formed at opposite ends of the inner peripheral surface by leaving annular end portions of the surface, a solid lubricant is embedded and fixed in the annular grooves, and each of the first and second helical grooves is open at its opposite end to the annular grooves. In the cylindrical bearing in which such annular grooves are formed, since the leakage of a lubricating oil from the opposite ends of the inner peripheral surface can be prevented by the annular grooves, a lubricating oil may be contained in the solid lubricant embedded and fixed in the first and second helical grooves.

In accordance with still another aspect of the invention, in the above-described arrangement, if the cylindrical bearing is developed in a planar state, the first helical grooves are formed with an equal interval between adjacent ones of the first helical grooves, while the second helical grooves are each formed with an angle $\theta_2$ of intersection with the reference line set at an angle identical to the angle $\theta_1$ of the first helical grooves, an interval between adjacent ones of the second helical grooves being different from the interval between the adjacent ones of the first helical grooves.

In accordance with a further aspect of the invention, in the above-described arrangement, if the cylindrical bearing is developed in a planar state, the first helical grooves are formed with an equal interval between adjacent ones of the first helical grooves, while the second helical grooves are each formed with an angle $\theta_2$ of intersection with the reference line set at an angle different from the angle $\theta_1$ of the first helical grooves, an interval between adjacent ones of the second helical grooves being identical to the interval between the adjacent ones of the first helical grooves.

In accordance with a still further aspect of the invention, in the above-described arrangement, if the cylindrical bearing is developed in a planar state, the first helical grooves are formed with an equal interval between adjacent ones of the first helical grooves, while the second helical grooves are each formed with an angle $\theta_2$ of intersection with the reference line set at an angle different from the angle $\theta_1$ of the first helical grooves, an interval between adjacent ones of the second helical grooves being different from the interval between the adjacent ones of the first helical grooves.

In the above-described invention, the preferable range of the angle $\theta_1$ and the angle $\theta_2$ is 10° to 30°. Although, in design, the angle $\theta_1$ and the angle $\theta_2$ may be set in a range of more than 0° and less than 90°, the angular range of 45° to 90° makes processing difficult due to the restriction in machining. Meanwhile, in a case where each of the angles $\theta_1$ and $\theta_2$ is set to a very small angle, e.g., less than 10°, the intersection angle of the grooves becomes extremely acute, so that it also presents a problem in machining. Accordingly, when machining is carried out, the preferable range of the angle $\theta_1$ and the angle $\theta_2$ becomes 10° to 30°.

The solid lubricant embedded and fixed in the helical grooves and the annular grooves formed in the inner peripheral surface of the bearing may preferably contain a lubricating oil. As an example of the solid lubricant containing a lubricating oil, it is possible to cite one which exhibits wettability and fluidity and has a solid lubricant powder as a main component, to which a lubricating oil which is liquid or paste-like at ordinary temperature, a carrier for absorbing and holding the lubricating oil, and a synthetic resin binder are added. Preferably, the solid lubricant which exhibits wettability and fluidity contains the solid lubricant powder as the main component, 5–30% by weight of the lubricating oil, 2–15% by weight of the carrier for absoring and holding the lubricating oil, and 15–50% by weight of the synthetic resin binder.

A specific description will be given of the respective components of the above-described solid lubricant. As the solid lubricant powder constituting the main component, it is possible to use at least one kind selected from substances which by themselves provide a solid lubricating effect independently, such as natural graphite, artificial graphite, natural flaky graphite, kish graphite, expanded graphite, molybdenum disulfide, polytetrafluoroethylene resin, and boron nitride.

As a lubricating oil which is fluid or paste-like at ordinary temperature, it is possible to cite mineral oils such as machine oil and engine oil, vegetable oils such as castor oil, and synthetic oils such as ester oil and silicone oil, greases and the like. At least one kind selected from them may be used.

As the carrier for absorbing and holding the lubricating oil, it is possible to cite a hydrocarbon-based wax, a higher fatty acid, a wax obtained by being derived from a higher fatty acid, a polyolefin resin powder, an oleophillic fiber, a crosslinked porous spherical powder having styrene or methacrylic substance as a main component, and porous calcium carbonate. At least one kind selected from them may be used.

As the synthetic resin binder, it is possible to use a thermosetting resin such as an epoxy resin, a phenol resin, and a polyester resin. In particularly, a liquid epoxy resin of an ordinary-temperature curing type or a liquid or powdered epoxy resin of a thermosetting type is preferable.

The solid lubricant including the above-described composition can be manufactured as follows. First, a carrier for absorbing and holding a lubricating oil is compounded and mixed with a solid lubricant powder, and a lubricating oil is compounded with that mixture. Then, a synthetic resin binder is added to the mixture consisting of the solid lubricant powder, the carrier, and the lubricating oil. As this mixture is kneaded, a solid lubricant which exhibits wettability and fluidity can be obtained.

Then, the solid lubricant which exhibits wettability and fluidity is filled in the helical grooves formed in the inner peripheral surface of the bearing by transfer molding or compression molding, and is thereby embedded and fixed in the helical grooves.

In the cylindrical bearing with a solid lubricant embedded and fixed in an inner peripheral surface thereof in accordance with the present invention, since the line which connects shorter diagonal lines of parallelograms each formed by connecting points of intersection of adjacent ones of the first helical grooves and adjacent ones of the second helical grooves intersecting with the adjacent ones of the first helical grooves forms an angle of less than 90° with respect to the reference line, it is possible to overcome the problem of the conventional art that the portions where the solid lubricant embedded and fixed in the helical grooves is arranged coarsely in the axial direction of the cylindrical metal base and the portions where the solid lubricant is arranged densely are clearly distinguishable. The solid lubricant is densely present as much as possible at the load points between the cylindrical bearing and the mating shaft member even if assembling is effected arbitrary without giving much consideration to the load points. As a result, it is possible to allow the performance of the solid lubricant to be demonstrated sufficiently.

In addition, in the cylindrical bearing of the present invention in which annular grooves are formed at opposite ends of the inner peripheral surface of the cylindrical bearing, the lubricating oil in the solid lubricant embedded and fixed in the helical grooves does not flow out from the end faces.

The above and other objects, features and advantages of the present invention will become more apparent from the following detailed description of the invention when read in conjunction with the accompanying drawings.

BRIEF DESCRIPTION OF THE DRAWINGS

FIG. 4 is a longitudinal cross-sectional view of the cylindrical bearing of the second example;

FIG. 6 is a longitudinal cross-sectional view of the cylindrical bearing of the third example;

DESCRIPTION OF THE PREFERRED EMBODIMENT

Example 1

Figure 1:
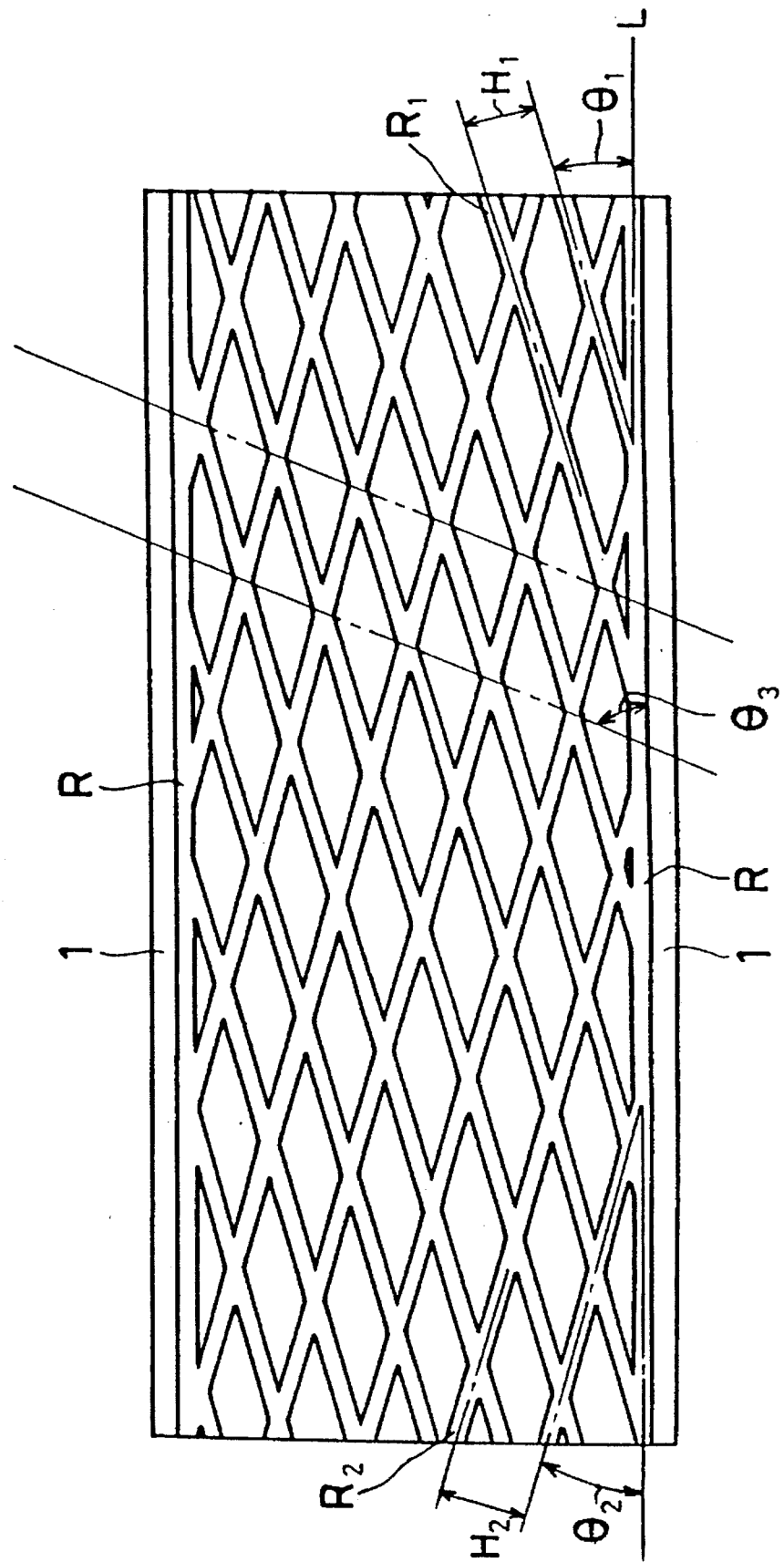
FIG. 1 is a plan view of a cylindrical bearing shown in FIG. 2 in accordance with a first example of the present invention, wherein the bearing is developed in a planar state.
Figure 2:
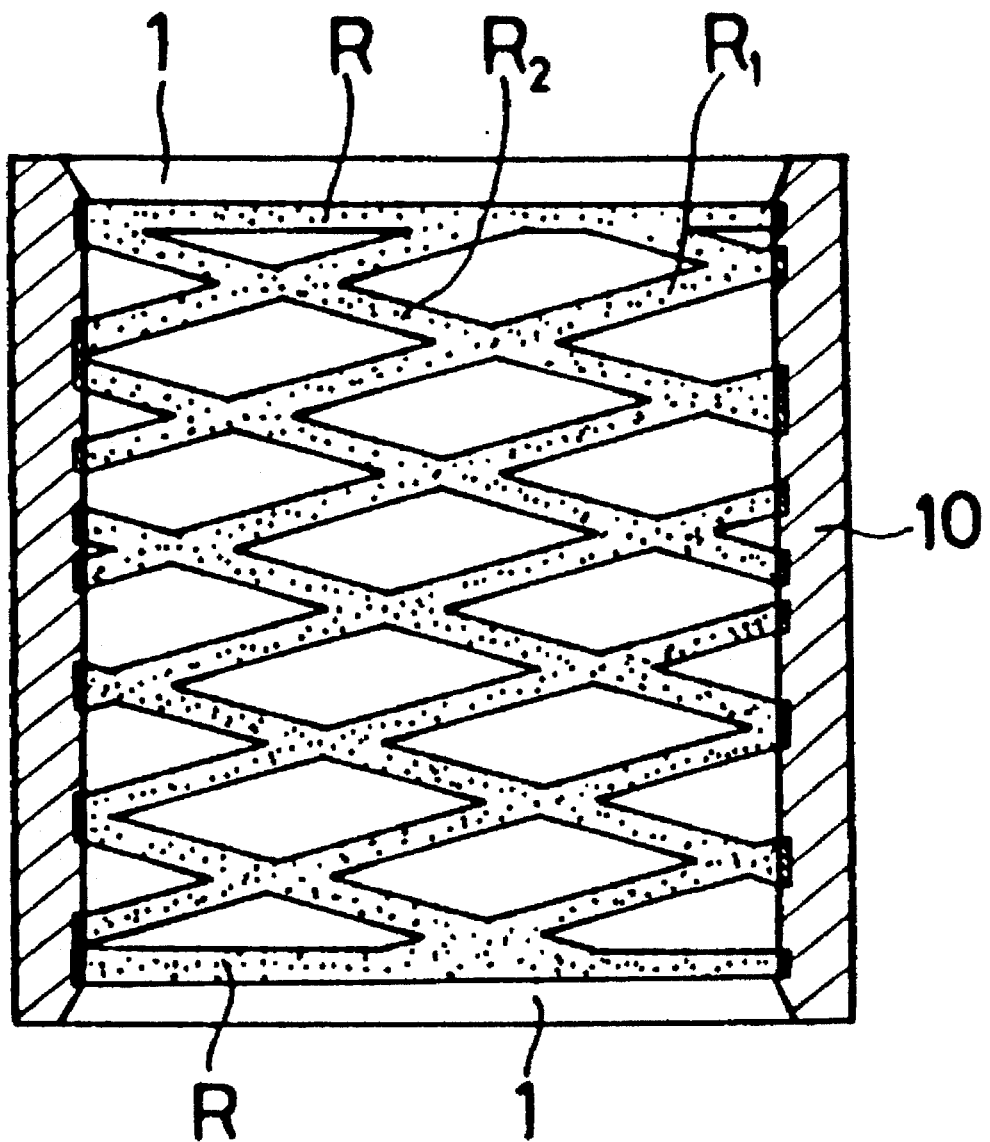
FIG. 2 is a longitudinal cross-sectional view of the cylindrical bearing of the first example.

In FIGS. 1 and 2, a cylindrical bearing comprises a cylindrical metal base 10 made of a copper alloy and having an inside diameter of 49 mm, an outside diameter of 59 mm, and a length of 30 mm, and a solid lubricant embedded and fixed in helical grooves $R_1$ and $R_2$ formed in an inner peripheral surface of the base 10. The helical grooves $R_1$ and $R_2$ were formed under the following conditions.

An annular groove R having a width of 2 mm and a depth of 2 mm was formed at each opposite end of the inner peripheral surface of the cylindrical metal base 10 by leaving an end portion 1 having a width of 3 mm from an end face.

Five helical grooves $R_1$, each having a width of 2 mm and a depth of 2 mm, were formed on the inner peripheral surface with a rightward rising inclination at an angle $\theta_1$ of 15° with respect to a reference line L defined by the center line of one of the annular grooves R, i.e., a line extending in a direction orthogonal to the axis of the cylindrical bearing, by maintaining an interval $H_1$ (distance between center lines of adjacent helical grooves $R_1$) of 6 mm between adjacent ones of the helical grooves $R_1$, and the five helical grooves $R_1$ were made open to the respective annular grooves R.

Meanwhile, four helical grooves $R_2$, each having a width of 2 mm and a depth of 2 mm, were formed on the inner peripheral surface with a leftward rising inclination at an angle $\theta_2$ with respect to the reference line L, which $\theta_2$ was identical to the angle $\theta_1$ for the grooves $R_1$, by maintaining an interval $H_2$ (distance between center lines of adjacent helical grooves $R_2$) of 8 mm between adjacent ones of the helical grooves $R_2$, and the four helical grooves $R_2$ were made open to the respective annular grooves R.

In this arrangement, a line which connects the shorter diagonal lines of parallelograms each formed by connecting the points of intersection of adjacent ones of the helical grooves $R_1$ and adjacent ones of the helical grooves $R_2$ intersecting with the adjacent ones of the helical grooves $R_1$ forms an angle $\theta_3$ of 67° with respect to the reference line L.

A method of preparing the solid lubricant and embedding and fixing the solid lubricant was carried out as follows.

PREPARATION OF SOLID LUBRICANT

As solid lubricant powders, 43% by weight of an artificial graphite powder, which was prepared by pulverizing a porous artificial graphite compact having a bulk density of 1.55 g/cm$^2$ and a porosity of 45% and adjusted to an average particle size of 100 mesh, and 10% by weight of a polytetrafluoroethylene resin powder were used. After 5% by weight of a hydrocarbon-based wax as a carrier was added to these powders, and they were mixed in a mixer. Subsequently, 15% by weight of a mineral oil as a lubricating oil was added to the mixture, and they were subjected to mixing, thereby obtaining a mixture of the solid lubricant powders, the carrier, and the lubricating oil.

Then, 16% by weight of a thermosetting epoxy resin as a synthetic resin binder was compounded with this mixture, and was kneaded, thereby obtaining a solid lubricant which exhibited wettability and fluidity.

METHOD OF EMBEDDING AND FIXING SOLID LUBRICANT

The solid lubricant was allowed to flow onto the inner peripheral surface of the cylindrical metal base 10 with the helical grooves $R_1$ and $R_2$ formed in the inner peripheral surface, by applying a pressure of 50 kg/cm$^2$ at ordinary temperature by using a fluid filling apparatus (not shown), thereby filling the solid lubricant densely into the helical grooves $R_1$ and $R_2$ and the annular grooves R in the inner peripheral surface.

Subsequently, the cylindrical metal base 10, in which the solid lubricant was held in the helical grooves $R_1$ and $R_2$ and the annular grooves R, was held for 60 minutes in a heating furnace heated to a temperature of 80° C. to effect the primary curing of the synthetic resin binder. Then, the cylindrical metal base 10 was held for 30 minutes in the heating furnace heated to a temperature of 140° C. to effect the secondary curing of the synthetic resin binder and to cause the solid lubricant containing the lubricant oil to be joined to the helical grooves $R_1$ and $R_2$ and the annular grooves R, thereby obtaining a cylindrical bearing having the solid lubricant embedded and fixed in its inner peripheral surface.

The rate of exposure of the solid lubricant in the overall surface area of the inner peripheral surface of this cylindrical bearing was 40%.

Example 2

Figure 3:
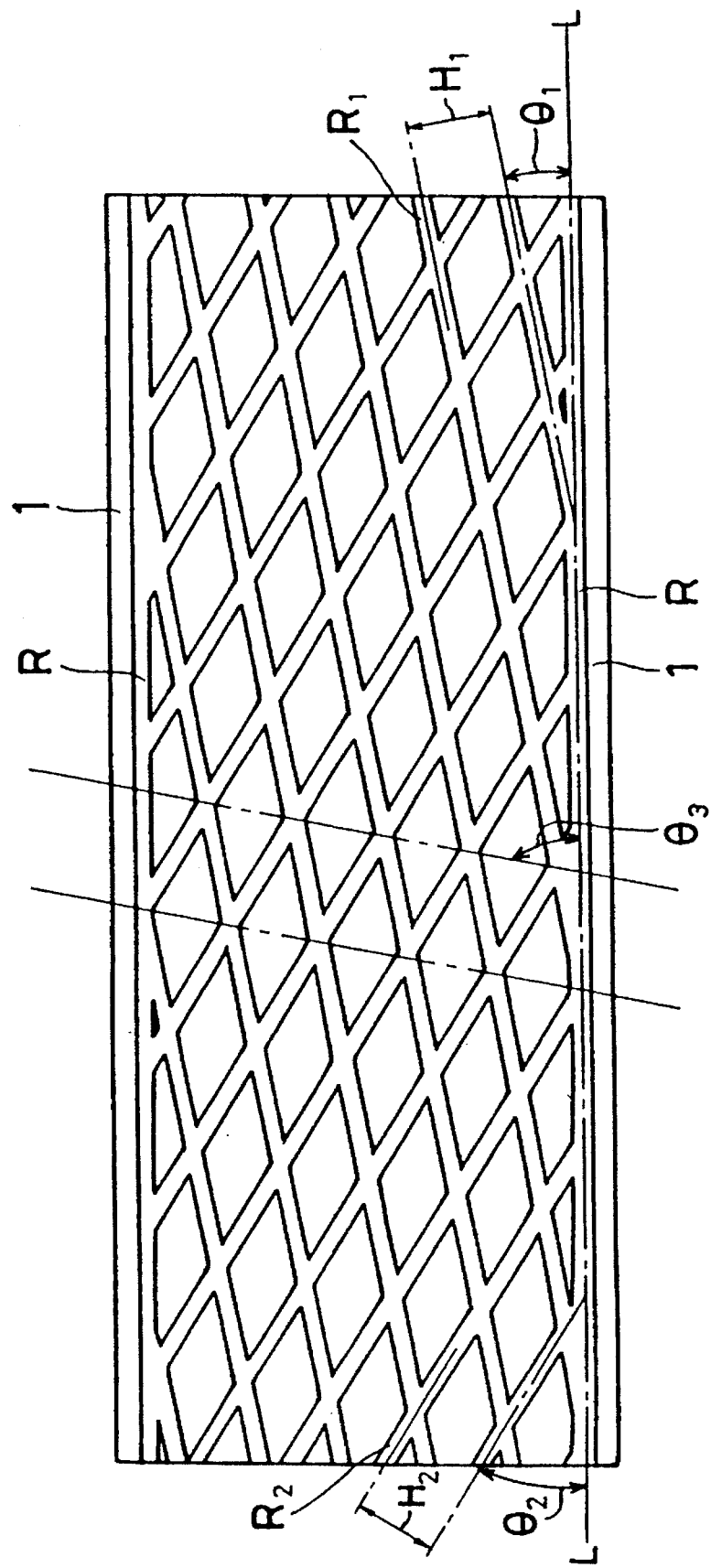
FIG. 3 is a plan view of a cylindrical bearing shown in FIG. 4 in accordance with a second example of the present invention, wherein the bearing is developed in a planar state.

In FIGS. 3 and 4, a cylindrical bearing comprises a cylindrical metal base 20 made of a copper alloy and having an inside diameter of 52 mm, an outside diameter of 62 mm, and a length of 60 mm, and a solid lubricant embedded and fixed in helical grooves $R_1$ and $R_2$ formed in an inner peripheral surface of the base 20. The helical grooves $R_1$ and $R_2$ were formed under the following conditions.

The annular groove R having a width of 2 mm and a depth of 2 mm was formed at each opposite end of an inner peripheral surface of the cylindrical metal base 20 by leaving an end portion 1 having a width of 3 mm from the end face.

Three helical grooves $R_1$, each having a width of 2 mm and a depth of 2 mm, were formed on the inner peripheral surface with a rightward rising inclination at an angle $\theta_1$ of 10° with respect to the reference line L defined by the center line of one of the annular grooves R, by maintaining an interval $H_1$ of 8 mm between the adjacent ones of the helical grooves $R_1$, and the three helical grooves $R_1$ were made open to the respective annular grooves R.

Meanwhile, eight helical grooves $R_2$, each having a width of 2 mm and a depth of 2 mm, were formed on the inner peripheral surface with a leftward rising inclination at an angle $\theta_2$ of 30° with respect to the reference line L, by setting the interval $H_2$ between the adjacent ones of the helical grooves $R_2$ to be identical to the interval $H_1$ between the adjacent ones of the helical grooves $R_1$, and the eight helical grooves $R_2$ were made open to the respective annular grooves R.

In this arrangement, a line which connects the shorter diagonal lines of parallelograms each formed by connecting the points of intersection of adjacent ones of the helical grooves $R_1$ and adjacent ones of the helical grooves $R_2$ intersecting with the adjacent ones of the helical grooves $R_1$ forms an angle $\theta_3$ of 79° with respect to the reference line L.

Subsequently, a cylindrical bearing having the solid lubricant embedded and fixed in its inner peripheral surface was obtained in the same way as in Example 1.

The rate of exposure of the solid lubricant in the overall surface area of the inner peripheral surface of this cylindrical bearing was 41%.

Example 3

Figure 5:
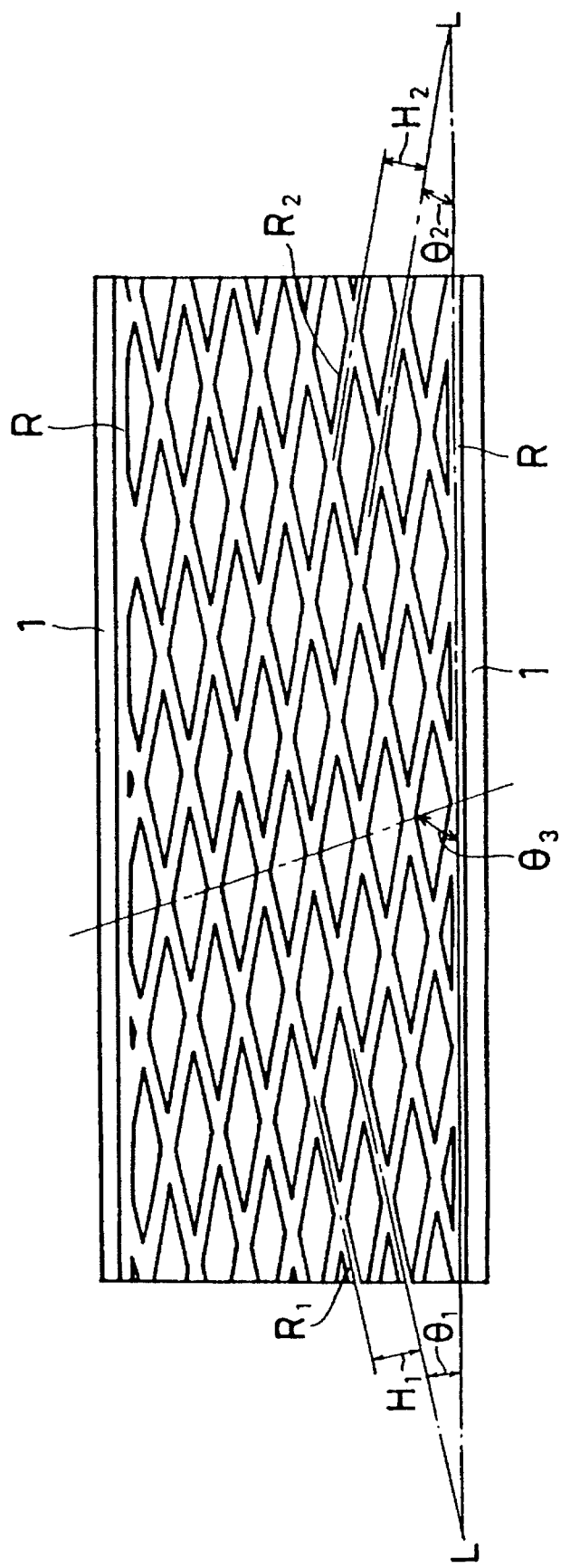
FIG. 5 is a plan view of a cylindrical bearing of FIG. 6 in accordance with a third example of the present invention, wherein the bearing is developed in a planar state.
Figure 7:
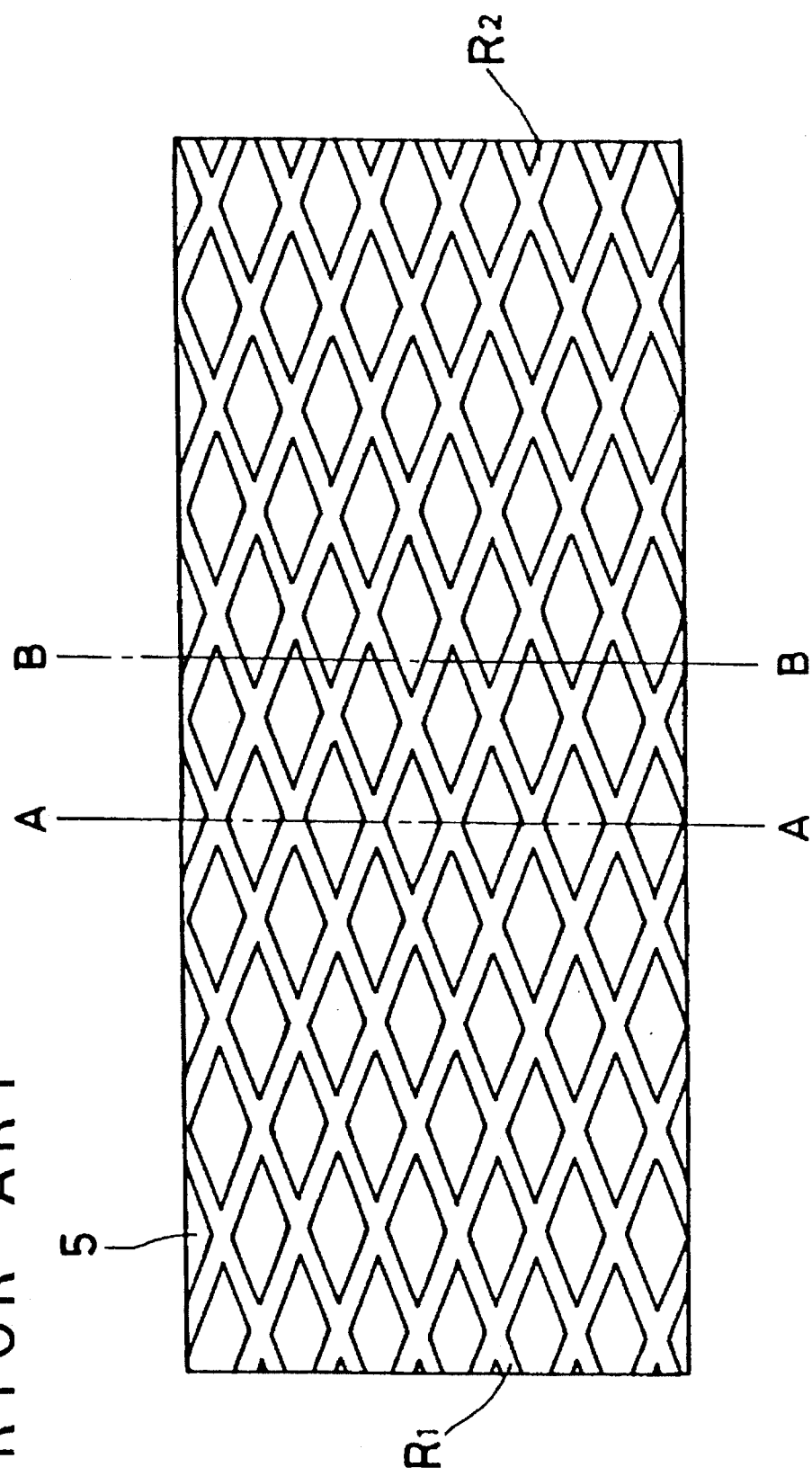
FIG. 7 is a plan view illustrating a developed conventional cylindrical bearing in accordance with the prior art.
Figure 8:
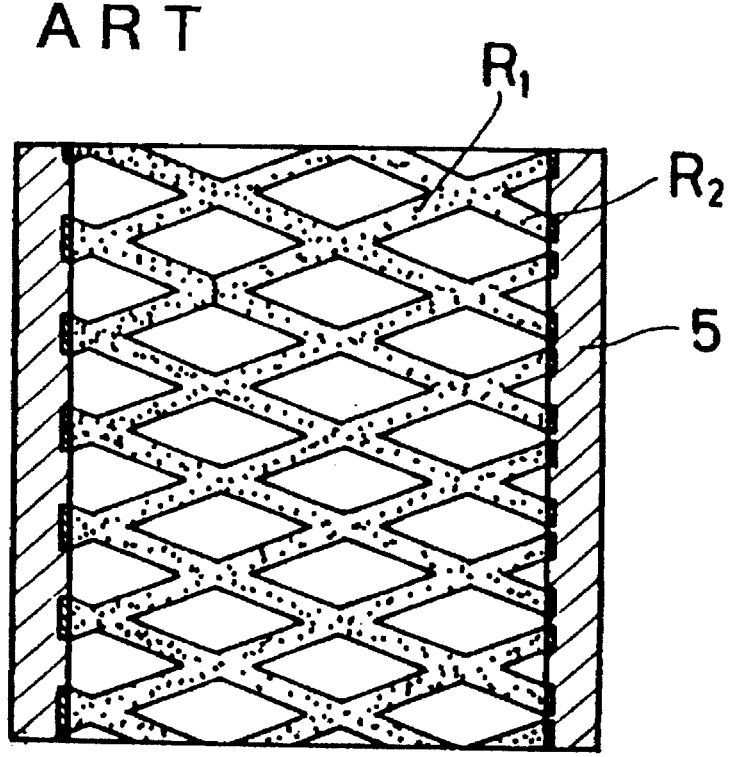
FIG. 8 is a longitudinal cross-sectional view of the cylindrical bearing in accordance with the prior art.

In FIGS. 5 and 6, a cylindrical bearing comprises a cylindrical metal base 30 made of a copper alloy and having an inside diameter of 50 mm, an outside diameter of 60 mm, and a length of 60 mm, and a solid lubricant embedded and fixed in helical grooves $R_1$ and $R_2$ formed in an inner peripheral surface of the base 30. The helical grooves $R_1$ and $R_2$ were formed under the following conditions.

The annular groove R having a width of 2 mm and a depth of 2 mm was formed at each opposite end of an inner peripheral surface of the cylindrical metal base 30 by leaving an end portion 1 having a width of 3 mm from the end face.

Four helical grooves $R_1$, each having a width of 2 mm and a depth of 2 mm, were formed on the inner peripheral surface with a rightward rising inclination at an angle $\theta_1$ of 12° with respect to the reference line L defined by the center line of one of the annular grooves R, by maintaining an interval $H_1$ of 8 mm between adjacent ones of the helical grooves $R_1$, and the four helical grooves $R_1$ were made open to the respective annular grooves R.

Meanwhile, four helical grooves $R_2$, each having a width of 2 mm and a depth of 2 mm, were formed on the inner peripheral surface with a leftward rising inclination at an angle $\theta_2$ of 10° with respect to the reference line L with an interval $H_2$ of 7 mm different from the interval $H_1$ (8 mm) between the adjacent ones of the helical grooves $R_1$, and the four helical grooves $R_2$ were made open to the respective annular grooves R.

In this arrangement, a line which connects the shorter diagonal lines of parallelograms each formed by connecting the points of intersection of adjacent ones of the helical grooves $R_1$ and adjacent ones of the helical grooves $R_2$ intersecting with the adjacent ones of the helical grooves $R_1$ forms an angle $\theta_3$ of 71° with respect to the reference line L.

Subsequently, a cylindrical bearing having the solid lubricant embedded and fixed in its inner peripheral surface was obtained in the same way as in Example 1.

The rate of exposure of the solid lubricant in the overall surface area of the inner peripheral surface of this cylindrical bearing was 48%.

In each of the above-described Examples 1, 2, and 3, the distinction between the portions where the solid lubricant embedded and fixed in the helical grooves $R_1$ and $R_2$ is arranged coarsely in the axial direction of the cylindrical metal base and the portions where the solid lubricant is arranged densely substantially disappears, so that directionality substantially disappears in the optimal load points between the solid lubricant and a mating shaft member. Hence, it is possible to assemble the mating shaft member onto the cylindrical bearing without giving much consideration to the load points, and it is also possible to reduce the assembly manhour. As a result, it is possible to allow the performance of the solid lubricant to be demonstrated sufficiently.

Furthermore, in each of the above-described Examples 1, 2, and 3, since the solid lubricant which exhibits fluidity and contains the lubricating oil is embedded and fixed in the helical grooves $R_1$ and $R_2$, means such as supplying a lubricating oil onto the sliding surface by means of an oiler is not required. Additionally, since the annular grooves R are provided, the leakage of the lubricating oil is eliminated, and it is possible to obtain the effect of the lubricating oil over extended periods of time, thereby obtaining desired stable sliding characteristics.

As described above, in accordance with the present invention, it is possible to overcome the problem of the conventional art that the portions where the solid lubricant embedded and fixed in the helical grooves is arranged coarsely in the axial direction of the cylindrical metal base and the portions where the solid lubricant is arranged densely are clearly distinguishable. The solid lubricant is densely present as much as possible at the load points between the cylindrical bearing and the mating shaft member even if assembling is effected arbitrary without giving much consideration to the load points. As a result, it is possible to allow the performance of the solid lubricant to be demonstrated sufficiently.

In addition, in the cylindrical bearing of the present invention in which annular grooves are formed at opposite ends of the inner peripheral surface of the cylindrical bearing, the lubricating oil in the solid lubricant embedded and fixed in the helical grooves does not flow out from the end faces. Thus, it is possible to obtain the effect of the lubricating oil over extended periods and to obtain the desired stable sliding characteristics.

What is claimed is:

1. A cylindrical bearing with a solid lubricant embedded in and fixed to an inner peripheral surface thereof, said solid lubricant being embedded in and fixed to a pair of annular grooves respectively formed at opposite ends of the inner peripheral surface by leaving annular end portions of the surface, said solid lubricant also being embedded in and fixed to a plurality of first helical and second helical grooves formed in the inner peripheral surface, each of said plurality of first and second helical grooves being opened at opposite ends thereof to said annular grooves, and wherein, if said cylindrical bearing is developed in a planar state, each of said first helical grooves is formed with a rightward rising inclination at an angle $\theta_1$ of more than 0° and not more than 45° with respect to a reference line defined by a line extending in a direction orthogonal to an axis of said cylindrical bearing, while each of said second helical grooves is formed with a leftward rising inclination at an angle $\theta_2$ of more than 0° and not more than 45° with respect to the reference line, a line which connects shorter diagonal lines of parallelograms each formed by connecting points of intersection of adjacent ones of said first helical grooves and adjacent ones of said second helical grooves intersecting with the adjacent ones of said first helical grooves form an angle $\theta_3$ of less than 90° with respect to the reference line.

2. A cylindrical bearing according to claim 1, wherein said solid lubricant contains a lubricating oil.

3. A cylindrical bearing according to claim 2, wherein, if said cylindrical bearing is developed in a planar state, said plurality of first helical grooves are formed with an equal interval between adjacent ones of said plurality of first helical grooves, while said plurality of second helical grooves are each formed with an angle $\theta_2$ of intersection with the reference line set at an angle identical to the angle $\theta_1$ of said first helical grooves, an interval between adjacent ones of said second helical grooves being different from the interval between the adjacent ones of said first helical grooves.

4. A cylindrical bearing according to claim 3, wherein a range of the angle $\theta_1$ is 10° to 30°.

5. A cylindrical bearing according to claim 2, wherein, if said cylindrical bearing is developed in a planar state, said plurality of first helical grooves are formed with an equal interval between adjacent ones of said plurality of first helical grooves, while said plurality of second helical grooves are each formed with an angle $\theta_2$ of intersection with the reference line set an angle different from the angle $\theta_1$ of said first helical grooves, an interval between adjacent ones of said second helical grooves being identical to the interval between the adjacent ones of said first helical grooves.

6. A cylindrical bearing according to claim 5, wherein a range of the angle $\theta_1$ and the angle $\theta_2$ is 10° to 30°.

7. A cylindrical bearing according to claim 2, wherein, if said cylindrical bearing is developed in a planar state, said plurality of first helical grooves are formed with an equal interval between adjacent ones of said plurality of first helical grooves, while said plurality of second helical grooves are each formed with an angle $\theta_2$ of intersection with the reference line set at an angle different from the angle $\theta_1$ of said first helical grooves, an interval between adjacent ones of said second helical grooves being different from the interval between the adjacent ones of said first helical grooves.

8. A cylindrical bearing according to claim 7, wherein a range of the angle $\theta_1$ and the angle $\theta_2$ is 10° to 30°.

9. A cylindrical bearing according to claim 1, wherein, if said cylindrical bearing is developed in a planar state, said plurality of first helical grooves are formed with an equal interval between adjacent ones of said plurality of first helical grooves, while said plurality of second helical grooves are each formed with an angle $\theta_2$ of intersection with the reference line set at an angle identical to the angle $\theta_1$ of said first helical grooves, an interval between adjacent ones of said second helical grooves being different from the interval between the adjacent ones of said first helical grooves.

10. A cylindrical bearing according to claim 9, wherein a range of the angle $\theta_1$ is 10° to 30°.

11. A cylindrical bearing according to claim 1, wherein, if said cylindrical bearing is developed in a planar state, said plurality of first helical grooves are formed with an equal interval between adjacent ones of said plurality of first helical grooves, while said plurality of second helical grooves are each formed with an angle $\theta_2$ of intersection with the reference line set at an angle different from the angle $\theta_1$ of said first helical grooves, an interval between adjacent ones of said second helical grooves being identical to the interval between the adjacent ones of said first helical grooves.

12. A cylindrical bearing according to claim 11, wherein a range of the angle $\theta_1$ and the angle $\theta_2$ is 10° to 30°.

13. A cylindrical bearing according to claim 1, wherein, if said cylindrical bearing is developed in a planar state, said plurality of said first helical grooves are formed with an equal interval between adjacent ones of said plurality of first helical grooves, while said plurality of second helical grooves are each formed with an angle $\theta_2$ of intersection with the reference line set at an angle different from the angle $\theta_1$ of said first helical grooves, an interval between adjacent ones of said second helical grooves being different from the interval between the adjacent ones of said first helical grooves.

14. A cylindrical bearing according to claim 13, wherein a range of the angle $\theta_1$ and the angle $\theta_2$ is 10° to 30°.

15. A cylindrical bearing with a solid lubricant embedded in and fixed to a plurality of first helical and second helical grooves formed in an inner peripheral surface thereof, wherein, if said cylindrical bearing is developed in a planar state, each of said first helical grooves is formed with a rightward rising inclination at an angle $\theta_1$ of more than 0° and not more than 45° with respect to a reference line defined by a line extending in a direction orthogonal to an axis of said cylindrical bearing, while each of said second helical grooves is formed with a leftward rising inclination at an angle $\theta_2$ of more than 0° and not more than 45° with respect to the reference line, a line which connects shorter diagonal lines of parallelograms each formed by connecting points of intersection of adjacent one of said first helical grooves and adjacent ones of said second helical grooves intersecting with the adjacent ones of said first helical grooves forms an angle $\theta_3$ of less than 90° with respect to the reference line, and wherein, if said cylindrical bearing is developed in a planar state, said plurality of first helical grooves are formed with an equal interval between adjacent ones of said plurality of first helical grooves, while said plurality of second helical grooves are each formed with an angle $\theta_2$ of intersection with the reference line set at angle identical to the angle $\theta_1$ of said first helical grooves, an interval between adjacent ones of said second helical grooves being different from the interval between the adjacent ones of said first helical grooves.

16. A cylindrical bearing according to claim 15, wherein a range of the angle $\theta_1$ is 10° to 30°.

17. A cylindrical bearing with a solid lubricant embedded in and fixed to a plurality of first helical and second helical grooves formed in an inner peripheral surface thereof, wherein, if said cylindrical bearing is developed in a planar state, each of said first helical grooves is formed with a rightward rising inclination at an angle $\theta_1$ of more than 0° and not more than 45° with respect to a reference line defined by a line extending in a direction orthogonal to an axis of said cylindrical bearing, while each of said second helical grooves is formed with a leftward rising inclination at an angle $\theta_2$ of more than 0° and not more than 45° with respect to the reference line, a line which connects shorter diagonal lines of parallelograms each formed by connecting points of intersection of adjacent ones of said first helical grooves and adjacent ones of said second helical grooves intersecting with the adjacent ones of said first helical grooves forms an angle $\theta_3$ of less than 90° with respect to the reference line, and wherein, if said cylindrical bearing is developed in a planar state, said plurality of first helical grooves are formed with an equal interval between adjacent ones of said plurality of first helical grooves, while said plurality of second helical grooves are each formed with an angle $\theta_2$ of intersection with the reference line set at an angle different from the angle $\theta_1$ of said first helical grooves, an interval between adjacent ones of said second helical grooves being identical to the interval between the adjacent ones of said first helical grooves.

18. A cylindrical bearing according to claim 17, wherein a range of the angle $\theta_1$ and the angle $\theta_2$ is 10° to 30°.

19. A cylindrical bearing with a solid lubricant embedded in and fixed to a plurality of first helical and second helical grooves formed in an inner peripheral surface thereof, wherein, if said cylindrical bearing is developed in a planar state, each of said first helical grooves is formed with a rightward rising inclination at an angle $\theta_1$ of more than 0° and not more than 45° with respect to a reference line defined by a line extending in a direction orthogonal to an axis of said cylindrical bearing, while each of said second helical grooves is formed with a leftward rising inclination at an angle $\theta_2$ of more than 0° and not more than 45° with respect to the reference line, a line which connects shorter diagonal lines of parallelograms each formed by connecting points of intersection of adjacent ones of said first helical grooves and adjacent ones of said second helical grooves intersecting with the adjacent ones of said first helical grooves forms an angle $\theta_3$ of less than 90° with respect to the reference line, and wherein, if said cylindrical bearing is developed in a planar state, said plurality of said first helical grooves are formed with an equal interval between adjacent ones of said plurality of first helical grooves, while said plurality of second helical grooves are each formed with an angle $\theta_2$ of intersection with the reference line set at an angle different from the angle $\theta_1$ of said first helical grooves, an interval between adjacent ones of said second helical grooves being different from the interval between the adjacent ones of said first helical grooves.

20. A cylindrical bearing according to claim 19, wherein a range of the angle $\theta_1$ and the angle $\theta_2$ is 10° to 30°.

\* \* \* \* \*

UNITED STATES PATENT AND TRADEMARK OFFICE
CERTIFICATE OF CORRECTION

PATENT NO. : 5,516,213
DATED : May 14, 1996
INVENTOR(S) : Shirosaku Moriyama; Toshihiko Sekine It is certified that error appears in the above-identified patent and that said letters patent is hereby corrected as shown below:

Column 9, line 32, delete "form" and insert --forms--.
Column 10, line 60, delete "one" and insert --ones--.

Signed and Sealed this

Eleventh Day of February, 1997

Attest:

BRUCE LEHMAN

*Attesting Officer*  *Commissioner of Patents and Trademarks*